US011268693B2

(12) United States Patent
Centner

(10) Patent No.: US 11,268,693 B2
(45) Date of Patent: Mar. 8, 2022

(54) NOZZLE ASSEMBLIES HAVING MULTIPLE ATTACHMENT METHODS

(71) Applicant: Illinois Tool Works Inc., Glenview, IL (US)

(72) Inventor: Robert J. Centner, Frankfort, IL (US)

(73) Assignee: Illinois Tool Works Inc., Glenview, IL (US)

( * ) Notice: Subject to any disclaimer, the term of this patent is extended or adjusted under 35 U.S.C. 154(b) by 264 days.

(21) Appl. No.: 16/262,581

(22) Filed: Jan. 30, 2019

(65) Prior Publication Data

US 2019/0242573 A1 Aug. 8, 2019

Related U.S. Application Data

(60) Provisional application No. 62/626,752, filed on Feb. 6, 2018.

(51) Int. Cl.
| | |
|---|---|
| *F23D 14/38* | (2006.01) |
| *F23D 14/52* | (2006.01) |
| *F23D 14/46* | (2006.01) |
| *F23D 14/60* | (2006.01) |
| *F23D 14/64* | (2006.01) |
| *B23K 9/29* | (2006.01) |
| *B23K 9/173* | (2006.01) |
| *B23K 9/32* | (2006.01) |

(52) U.S. Cl.
CPC ............. *F23D 14/38* (2013.01); *B23K 9/173* (2013.01); *B23K 9/295* (2013.01); *B23K 9/32* (2013.01); *F23D 14/46* (2013.01); *F23D 14/52* (2013.01); *F23D 14/60* (2013.01); *F23D 14/64* (2013.01)

(58) Field of Classification Search
CPC .......... F23D 14/38; F23D 14/46; F23D 14/40; F23D 14/465; F23D 14/52; F16B 21/065; B23K 9/0203; B23K 9/1735; F16L 15/04; F16L 15/009
See application file for complete search history.

(56) References Cited

U.S. PATENT DOCUMENTS

| | | |
|---|---|---|
| 3,210,523 A | 10/1965 | Cotter |
| 3,541,298 A | 11/1970 | Carkhuff |
| | (Continued) | |

FOREIGN PATENT DOCUMENTS

| | | |
|---|---|---|
| CH | 509127 | 6/1971 |
| CN | 87102295 | 10/1987 |
| | (Continued) | |

OTHER PUBLICATIONS

Int'l Search Report and Written Opinion for Application No. PCT/US2017/018059 dated May 8, 2017 (12 pages).

(Continued)

*Primary Examiner* — Jorge A Pereiro
(74) *Attorney, Agent, or Firm* — McAndrews, Held & Malloy, Ltd

(57) ABSTRACT

A welding torch having a nozzle assembly with multiple attachment methods is disclosed. The nozzle assembly includes a nozzle shell, an electrically insulating sleeve, and a nozzle insert. The nozzle insert is configured for attachment to gas diffuser assemblies with different attachment mechanisms (e.g. a slip-on mechanism relying on frictional force, and/or screw-on mechanism relying on torque).

14 Claims, 9 Drawing Sheets

(56) References Cited

U.S. PATENT DOCUMENTS

| | | | |
|---|---|---|---|
| 3,576,423 A | 4/1971 | Bernard | |
| 3,596,049 A | 7/1971 | Ogden | |
| 3,689,732 A | 9/1972 | Hill | |
| 3,812,756 A * | 5/1974 | Wenger | F16B 21/18 411/353 |
| 3,858,156 A * | 12/1974 | Zarro | H01R 24/40 439/221 |
| 3,863,421 A * | 2/1975 | Busch | F16B 41/002 403/408.1 |
| 3,868,806 A * | 3/1975 | Dey | F16B 5/0208 411/353 |
| 4,097,074 A * | 6/1978 | Nagao | F16L 27/1275 285/231 |
| 4,280,043 A | 7/1981 | Feix | |
| 4,403,136 A * | 9/1983 | Colman | B23K 9/291 219/137.31 |
| 4,529,863 A | 7/1985 | Lebel | |
| 4,563,569 A | 1/1986 | Shiramizu | |
| 4,643,467 A * | 2/1987 | Wood | E21B 17/042 285/334 |
| 4,672,163 A | 6/1987 | Matsui | |
| 4,675,493 A | 6/1987 | Gartland | |
| 4,767,908 A | 8/1988 | Dallavalle | |
| 4,927,065 A * | 5/1990 | Beck | B65D 47/242 222/520 |
| 4,945,208 A | 7/1990 | Lian | |
| 4,954,688 A | 9/1990 | Winterfeldt | |
| 5,013,885 A | 5/1991 | Carkhuff | |
| 5,338,917 A | 8/1994 | Stuart | |
| 5,349,158 A * | 9/1994 | Mari | B23K 9/285 219/137.62 |
| 5,378,048 A * | 1/1995 | Parrott | E21C 35/187 299/81.3 |
| 5,380,980 A | 1/1995 | Colling | |
| 5,385,420 A * | 1/1995 | Newman, Sr | B25G 3/04 15/145 |
| 5,440,100 A | 8/1995 | Stuart | |
| 5,464,110 A * | 11/1995 | Heyworth | B65D 41/04 215/223 |
| 5,491,321 A | 2/1996 | Stuart | |
| 5,544,955 A * | 8/1996 | Wakefield | F16C 17/22 384/295 |
| 5,635,090 A | 6/1997 | Lubieniecki | |
| 5,669,556 A | 9/1997 | Yoshida | |
| 5,726,420 A | 3/1998 | Lajoie | |
| 5,760,373 A | 6/1998 | Colling | |
| 5,772,102 A | 6/1998 | New | |
| 6,075,227 A | 6/2000 | Lajoie | |
| 6,078,023 A | 6/2000 | Jones | |
| 6,163,008 A | 12/2000 | Roberts | |
| 6,191,380 B1 | 2/2001 | Thomas | |
| 6,225,599 B1 | 5/2001 | Alterkruse | |
| 6,271,497 B1 | 8/2001 | Zapletal | |
| 6,307,179 B1 | 10/2001 | Walters | |
| 6,318,643 B1 * | 11/2001 | Cooke | F02M 61/16 239/533.2 |
| 6,352,439 B1 * | 3/2002 | Stark | F16L 37/008 174/655 |
| 6,464,527 B2 * | 10/2002 | Volpe | H01R 24/52 439/352 |
| 6,525,297 B2 | 2/2003 | Doherty | |
| 6,596,939 B1 * | 7/2003 | Gretz | F16L 5/00 174/152 G |
| 6,657,162 B1 | 12/2003 | Jung | |
| 6,740,848 B2 | 5/2004 | Parker | |
| 6,744,013 B2 | 6/2004 | Jones | |
| 6,847,009 B2 | 1/2005 | Stuart | |
| 7,105,775 B2 | 9/2006 | Giese | |
| 7,176,412 B2 | 2/2007 | Wells | |
| 7,256,366 B2 | 8/2007 | Severance, Jr. | |
| 7,342,200 B2 | 3/2008 | Eberle | |
| 7,721,391 B2 * | 5/2010 | Bukovitz | B25G 3/14 16/429 |
| 8,552,341 B2 | 10/2013 | Zamuner | |
| 8,875,350 B2 * | 11/2014 | Bukovitz | C08F 293/00 16/429 |
| 8,991,012 B1 * | 3/2015 | Hilbrant | B25G 3/28 16/427 |
| 9,138,824 B2 | 9/2015 | Giese | |
| 9,481,047 B2 | 11/2016 | Hassan | |
| 9,597,745 B2 | 3/2017 | Murata et al. | |
| 9,791,084 B2 * | 10/2017 | Fujii | F16L 47/041 |
| 9,950,386 B2 * | 4/2018 | Cooper | B23K 9/26 |
| 10,155,280 B2 | 12/2018 | Cooper | |
| 10,293,426 B2 | 5/2019 | Kachline | |
| 10,863,610 B2 * | 12/2020 | Namburu | B23K 35/0205 |
| 2002/0113046 A1 * | 8/2002 | Altekruse | B23K 9/173 219/137.42 |
| 2002/0113047 A1 * | 8/2002 | Doherty | B23K 9/173 219/137.42 |
| 2003/0057196 A1 | 3/2003 | Jones | |
| 2003/0209530 A1 | 11/2003 | Stuart | |
| 2004/0026394 A1 * | 2/2004 | Giese | B23K 9/295 219/137.42 |
| 2004/0100097 A1 * | 5/2004 | Fukano | F16L 47/041 285/322 |
| 2005/0218132 A1 | 10/2005 | Wells | |
| 2007/0054534 A1 * | 3/2007 | Kauffman | H01R 13/6277 439/345 |
| 2007/0284354 A1 * | 12/2007 | Laymon | B23K 9/293 219/137.51 |
| 2008/0237307 A1 * | 10/2008 | Bessette | F16L 41/008 228/140 |
| 2011/0006522 A1 | 1/2011 | Bichler et al. | |
| 2011/0297657 A1 | 12/2011 | Kutsuna et al. | |
| 2012/0125903 A1 | 5/2012 | Izutani et al. | |
| 2013/0126504 A1 | 5/2013 | Hassan | |
| 2013/0126505 A1 | 5/2013 | Hassan | |
| 2013/0126506 A1 | 5/2013 | Hassan | |
| 2013/0134143 A1 | 5/2013 | Hassan | |
| 2014/0263251 A1 | 9/2014 | Enyedy | |
| 2014/0263254 A1 | 9/2014 | Enyedy | |
| 2014/0312023 A1 | 10/2014 | Centner et al. | |
| 2014/0319103 A1 | 10/2014 | Stabb et al. | |
| 2015/0129570 A1 | 5/2015 | Redding | |
| 2015/0129571 A1 | 5/2015 | Hassan | |
| 2015/0129572 A1 | 5/2015 | Hassan | |
| 2015/0135796 A1 | 5/2015 | Hassan | |
| 2015/0136747 A1 | 5/2015 | Hassan | |
| 2015/0136748 A1 | 5/2015 | Hassan | |
| 2015/0136749 A1 | 5/2015 | Hassan | |
| 2015/0152985 A1 * | 6/2015 | Koditkar | F16L 15/08 285/390 |
| 2015/0165542 A1 | 6/2015 | Hassan | |
| 2015/0273616 A1 | 10/2015 | Cooper | |
| 2016/0082540 A1 | 3/2016 | Hassan | |
| 2016/0144446 A1 | 5/2016 | Centner | |
| 2017/0165780 A1 | 6/2017 | Centner | |
| 2017/0282278 A1 | 10/2017 | Centner | |
| 2018/0036826 A1 * | 2/2018 | Carletti | B23K 9/16 |
| 2019/0113420 A1 * | 4/2019 | Johnson | B05B 1/22 |
| 2020/0025095 A1 * | 1/2020 | Suchezky | F02C 7/266 |
| 2020/0238070 A1 * | 7/2020 | Ryan | A61M 39/162 |

FOREIGN PATENT DOCUMENTS

| | | |
|---|---|---|
| CN | 101925433 | 12/2010 |
| CN | 102753296 | 10/2012 |
| CN | 104209636 | 12/2014 |
| CN | 104985308 | 10/2015 |
| CN | 105108403 | 12/2015 |
| CN | 108495731 | 9/2018 |
| DE | 202013102979 | 7/2013 |
| EP | 1388388 | 2/2004 |
| EP | 2457682 | 5/2012 |
| FR | 2291819 | 11/1974 |
| FR | 2291819 A1 | 6/1976 |
| JP | H05196022 U | 8/1976 |
| JP | 5290444 | 7/1977 |
| JP | S55156680 A | 12/1980 |
| JP | S57134279 A | 8/1982 |

(56) References Cited

FOREIGN PATENT DOCUMENTS

| | | |
|---|---|---|
| JP | 6021184 | 2/1985 |
| JP | 2001191178 | 7/2001 |
| JP | 2002059265 | 2/2002 |
| WO | 0073700 A1 | 12/2000 |
| WO | 2007030720 | 3/2007 |
| WO | 2008018979 | 4/2008 |
| WO | 2014178556 | 11/2014 |
| WO | 2015148656 | 10/2015 |
| WO | 2017100508 | 6/2017 |
| WO | 2018195247 | 10/2018 |

OTHER PUBLICATIONS

Robotics® Welding Technology Division, General Catalog, En.Robotics.cat.01.0117.R (Part 1) (95 pages).

Plasma Cutter Consumables Tips Electrodes Set For 50A! | eBay, http://www.ebay.com/itm/PLASMA-CUTTER-CONSUMABLES-TIPS-ELECTRODES-SET-FOR-50A-/391482871282, Feb. 16, 2017 (5 pages).

Robotics® Welding Technology Division, General Catalog, En.Robotics.cat.01.0117.R (Part 2) (95 pages).

Excerpt from Victor Equipment Company Brochure, pp. 24,32,34 (1951).

Excerpt from Victor Equipment Company Welding and Cutting Equipment Brochure, Catalog 20C 10-51 CW (1965).

FasTip Contact Tips, XR-Aluma-Pro Gooseneck-Style Push-Pull Gun, MIG Gun for Aluminum Welding, Miller Electric Manufacturing Company, Jan. 2015, p. 3.

International Search Report and Written Opinion Appln. No. PCT/US2016/065722, dated May 30, 2017, 19 pgs.

International Search Report and Written Opinion Appln. No. PCT/US2018/037004, dated Oct. 30, 2018, 15 pgs.

Canadian Office Action Appln No. 3,005,362 dated Mar. 18, 2019 (7 pages).

Int'l Search Report and Written Opinion for Application No. PCT/US2019/016748 dated Jun. 5, 2019 (20 pages).

Int'l Search Report and Written Opinion for Application No. PCT/US2019/016746 dated Jun. 5, 2019 (21 pages).

Final Office Action U.S. Appl. No. 15/622,912 dated Jun. 19, 2020.

Non Final Office Action Office Action U.S. Appl. No. 15/622,912 dated Dec. 11, 2019.

Final Office Action U.S. Appl. No. 15/370,884 dated Jun. 22, 2020.

Non Final Office Action Office Action U.S. Appl. No. 15/370,884 dated Dec. 17, 2019.

European Patent Office, Office Action, Application No. 19706154.2, dated Aug. 17, 2021, 7 pages.

\* cited by examiner

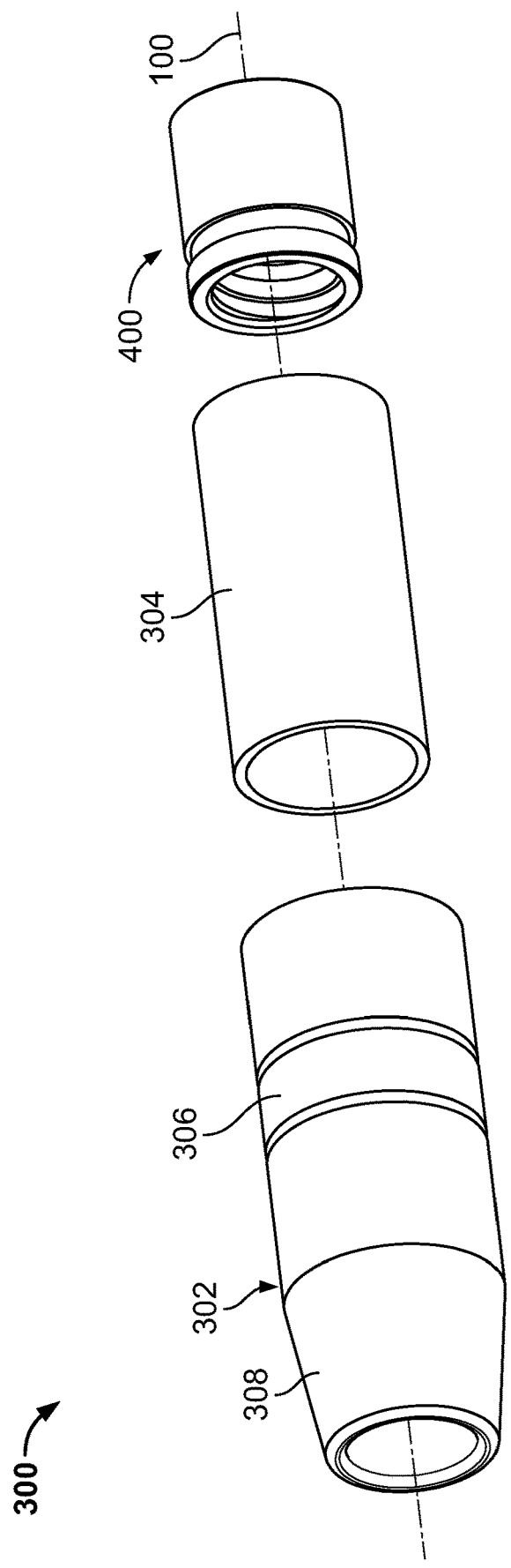

NOZZLE ASSEMBLIES HAVING MULTIPLE ATTACHMENT METHODS

CROSS REFERENCE TO RELATED APPLICATION

This application claims the benefit of U.S. Provisional Application No. 62/626,752 filed Feb. 6, 2018, which is hereby incorporated by reference in its entirety.

TECHNICAL FIELD

The present disclosure generally relates to nozzle assemblies for welding torches and, more particularly, to nozzle assemblies having multiple attachment methods.

BACKGROUND

Conventional arc welding torches have a nozzle that attaches to a work end of the torch. The nozzle may attach to a removable component of the torch (e.g. a gas diffuser, head, and/or nozzle holder of the torch), using one of several methods. Conventional nozzles and torches (and/or removable components of the torch) are only configured for one attachment method, and the attachment method of the removable component and nozzle (and/or torch) must be coordinated in order to ensure secure attachment. To service customers and/or operators who have different requirements and/or preferences regarding the nozzle attachment method used, manufacturers, suppliers, distributors, and/or operators must keep track of a large number of different parts in order to ensure proper attachment and/or operation of the welding torch.

BRIEF SUMMARY

Systems and methods are provided for a nozzle assembly having multiple attachment methods, substantially as shown in and/or described in connection with at least one of the figures, as set forth more completely in the claims.

These and other advantages, aspects and novel features of the present invention, as well as details of an illustrated example thereof, will be more fully understood from the following description and drawings.

BRIEF DESCRIPTION OF THE DRAWINGS

FIG. 3 is an exploded view of an example nozzle assembly.

The figures are not necessarily to scale. Similar or identical reference numerals may be used to refer to similar or identical components.

DETAILED DESCRIPTION OF THE INVENTION

Figure 1:
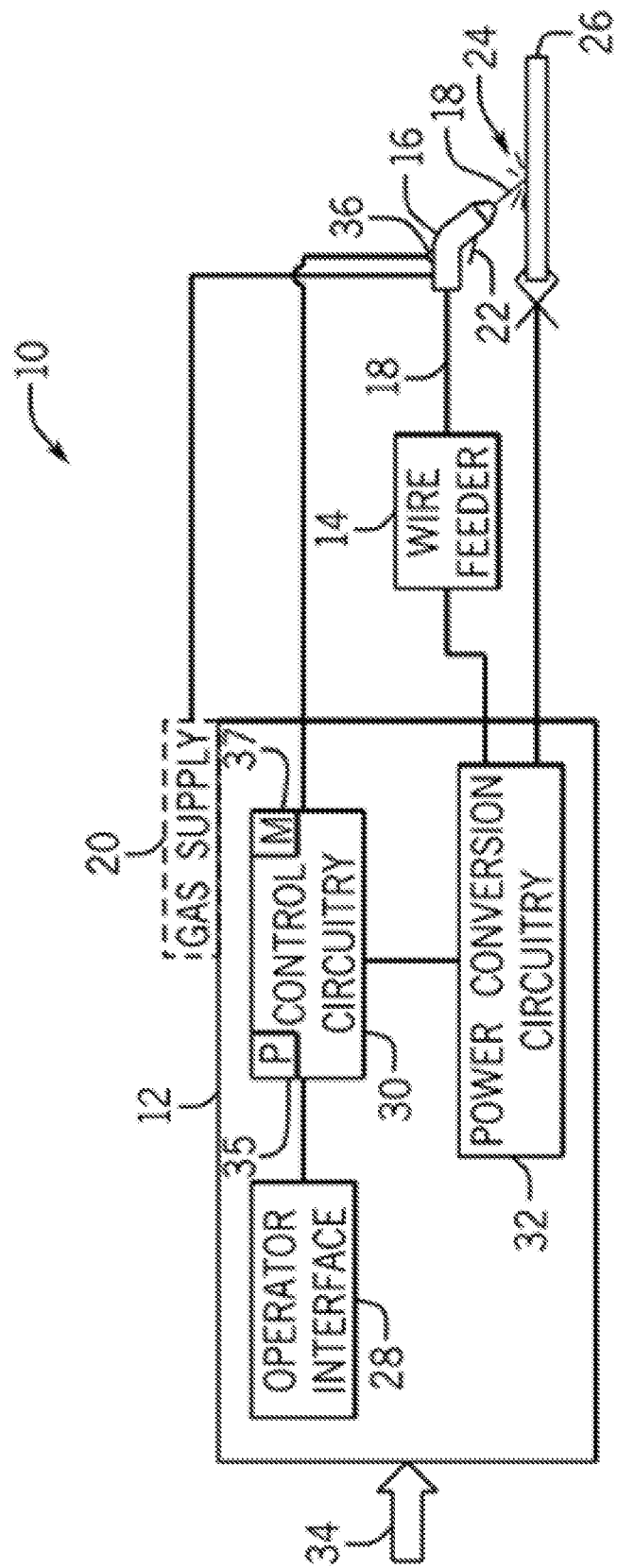
FIG. 1 is an example of a metal inert gas (MIG) welding system with a power source and a wire feeder, in accordance with this disclosure.

Preferred examples of the present disclosure may be described hereinbelow with reference to the accompanying drawings. In the following description, well-known functions or constructions are not described in detail because they may obscure the disclosure in unnecessary detail. For this disclosure, the following terms and definitions shall apply.

As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z".

As utilized herein, the term "exemplary" means serving as a non-limiting example, instance, or illustration. As utilized herein, the terms "e.g.," and "for example" set off lists of one or more non-limiting examples, instances, or illustrations.

The terms "coupled," "coupled to," and "coupled with" as used herein, each mean a structural and/or electrical connection, whether attached, affixed, connected, joined, fastened, linked, and/or otherwise secured. The term "attach" means to affix, couple, connect, join, fasten, link, and/or otherwise secure. The term "connect," means to attach, affix, couple, join, fasten, link, and/or otherwise secure.

The terms "about" and/or "approximately," when used to modify or describe a value (or range of values), position, orientation, and/or action, mean reasonably close to that value, range of values, position, orientation, and/or action. Thus, the embodiments described herein are not limited to only the recited values, ranges of values, positions, orientations, and/or actions but rather should include reasonably workable deviations.

As used herein, the terms "front" and/or "forward" refer to locations closer to a welding arc, while "rear" refers to locations farther from a welding arc.

Some examples of the present disclosure relate to a nozzle assembly, comprising a nozzle shell, an insulator positioned within the shell, and a nozzle insert positioned within the insulator. The nozzle insert may comprise a first surface configured to frictionally engage a first type of gas diffuser assembly, and threads to engage a second type of gas diffuser assembly.

In some examples, the threads are formed in a wall of the nozzle insert and are configured to mate with and engage complementary screw threads of the second type of gas diffuser assembly. In some examples, the nozzle insert comprises a shoulder formed in the wall between the threads and the first surface, where the shoulder is configured to abut a complementary front shoulder of the first type of gas diffuser assembly or the second type of gas diffuser assembly, and the nozzle insert further includes a rear end configured to abut a rear shoulder of the first type of gas diffuser assembly or the second type of gas diffuser assembly. In some examples, the nozzle insert comprises a bore extending from a front end of the nozzle insert to a rear end of the nozzle insert, wherein the threads comprise a major diameter and a minor diameter, and wherein the first surface has a first diameter. In some examples, the first surface is toward the rear end of the nozzle assembly relative to the threads, and the first diameter is larger than the major diameter and the minor diameter of the threads. In some examples, the first surface is toward the front end of the nozzle assembly relative to the threads, and the first diameter is smaller than the major diameter and the minor diameter of the threads. In some examples, the nozzle insert comprises a shoulder formed in the wall between the threads and the first surface, where the shoulder is configured to abut a complementary front shoulder of the first type of gas diffuser assembly or the second type of gas diffuser assembly, and where the nozzle insert further comprises a rear end configured to abut a rear shoulder of the first type of gas diffuser assembly or the second type of gas diffuser assembly. In some examples, the first surface is further configured to frictionally engage the second type of gas diffuser assembly when the threads are engaged to the second type of gas diffuser assembly, such that both the threads and the first surface resist disengagement of the gas diffuser assembly from the nozzle assembly.

Some examples of the present disclosure relate to a method of coupling a nozzle assembly to a gas diffuser assembly, the method comprising providing a nozzle assembly having a nozzle insert configured to engage each of a first coupling mechanism and a second coupling mechanism, and coupling a gas diffuser assembly having at least one of the first coupling mechanism or the second coupling mechanism, such that the nozzle insert engages the first coupling mechanism or the second coupling mechanism to couple the gas diffuser assembly to the nozzle assembly.

In some examples, the first coupling mechanism is a screw thread. In some examples, the second coupling mechanism is a compressible retaining ring, and the compressible retaining ring is constructed of a spring type material such that it generates a radially outward force upon being compressed. In some examples, the gas diffuser assembly comprises a first gas diffuser assembly having the first coupling mechanism, and the method further comprises uncoupling the first gas diffuser assembly from the nozzle assembly, and coupling the nozzle assembly to a second gas diffuser assembly having the second coupling mechanism. In some examples, the first coupling mechanism is a screw thread and the second coupling mechanism is a compressible retaining ring, and the compressible retaining ring is constructed of a spring type material such that it generates a radially outward force upon being compressed. In some examples, the first gas diffuser assembly also has the second coupling mechanism, such that the nozzle insert engages both the first coupling mechanism and the second coupling mechanism of the first gas diffuser assembly when the first gas diffuser assembly is coupled to the nozzle assembly.

Some examples of the present disclosure relate to a welding torch, comprising a nozzle shell, a nozzle insert positioned within the nozzle shell, and a gas diffuser assembly engaged with the nozzle insert. The nozzle insert comprises an engaging surface configured to frictionally engage a compressible member of a gas diffuser assembly and screw threads to engage complementary screw threads of the gas diffuser assembly, and the gas diffuser assembly comprises at least one of the compressible member and the complementary screw threads for engaging the nozzle insert.

In some examples, the welding torch further comprises an insulator positioned between the nozzle shell and the nozzle insert. In some examples, the nozzle insert comprises a shoulder between the screw threads and the engaging surface, where the shoulder abuts a complementary front shoulder of the gas diffuser assembly, and the nozzle insert further comprises a rear end configured to abut a rear shoulder of the gas diffuser assembly. In some examples, the nozzle insert includes a rear end and a front end, where the engaging surface is toward the rear end of the nozzle insert relative to the threads, and where the compressible member engages the engaging surface toward the shoulder of the nozzle insert, relative to the rear end. In some examples, the nozzle insert includes a rear end and a front end, where the engaging surface is toward the front end of the nozzle insert relative to the threads, and the compressible member engages the engaging surface toward the shoulder of the nozzle insert, relative to the front end. In some examples, the gas diffuser assembly comprises both the compressible member and the complementary screw threads.

Accommodating multiple types nozzle assemblies and gas diffuser assemblies (e.g., slip-on attachment, screw-on attachment, etc.) has caused an increase in the inventories that manufacturers, distributors, and/or end users must maintain and/or manage Example nozzle assemblies disclosed herein allow for a same nozzle to be attached to both a slip-on style gas diffuser (and/or head, nozzle holder, etc.) and a screw-on style gas diffuser. Thus, disclosed nozzle assemblies obviate the need for separate nozzles for each style. The example nozzle and gas diffuser assemblies of the present disclosure would significantly reduce the amount of nozzle inventory a manufacturer, distributor, and/or end user needs to maintain and/or manage.

A disclosed example nozzle assembly comprises three separate parts that are secured together into a nozzle assembly: an outer shell, an electrically insulating sleeve, and a nozzle insert. The nozzle insert of the disclosed example nozzle assembly is different from conventional nozzle inserts in that the nozzle insert is capable of attachment to both slip-on and screw-on style gas diffuser assemblies.

FIG. 1 shows an example of a metal inert gas (MIG) welding system 10 that may use any of the example gas diffuser assemblies, nozzle assemblies, and/or other components discussed below. While the welding system 10 is a MIG welding system, other types of welding systems may be used. FIG. 1 illustrates a welding system 10 as including a power source 12 coupled to a wire feeder 14. In the illustrated example, the power source 12 is separate from the wire feeder 14, such that the wire feeder 14 may be positioned at some distance from the power source 12 near a welding location. However, it should be understood that the wire feeder 14, in some implementations, may be integral with the power source 12. The power source 12 may supply weld power to a torch 16 through the wire feeder 14, or the power source 12 may supply weld power directly to the torch 16. The wire feeder 14 supplies a wire electrode 18 (e.g., solid wire, cored wire, coated wire) to the torch 16. A gas supply 20, which may be integral with or separate from the power source 12, supplies a gas (e.g., $CO_2$, argon) to the torch 16. An operator may engage a trigger 22 of the torch 16 to initiate an arc 24 between the electrode 18 and a work piece 26. In some examples, the welding system 10 may be triggered by an automation interface including, but not limited to, a programmable logic controller (PLC) or robot controller. The welding system 10 is designed to provide welding wire (e.g., electrode 18), weld power, and shielding gas to the welding torch 16. As will be appreciated by those skilled in the art, the welding torch 16 may be of many different types, and may facilitate use of various combinations of electrodes 18 and gases.

The welding system 10 may receive data settings from the operator via an operator interface 28 provided on the power source 12. The operator interface 28 may be incorporated into a faceplate of the power source 12, and may allow for selection of settings such as the weld process (e.g., stick, TIG, MIG), the type of electrode 18 to be used, voltage and current settings, transfer mode (e.g., short circuit, pulse, spray, pulse), and so forth. In particular, the welding system 10 allows for MIG welding (e.g., pulsed MIG welding) with electrodes 18 (e.g., welding wires) of various materials, such as steel or aluminum, to be channeled through the torch 16. The weld settings are communicated to control circuitry 30 within the power source 12.

The control circuitry 30 operates to control generation of welding power output that is applied to the electrode 18 by power conversion circuitry 32 for carrying out the desired welding operation. For example, in some examples, the control circuitry 30 may be adapted to regulate a pulsed MIG welding regime that may have aspects of short circuit transfer and/or of spray transfer of molten metal from the welding wire to a molten weld pool of a progressing weld. Such transfer modes may be controlled during operation by adjusting operating parameters of current and voltage pulses for arcs 24 developed between the electrode 18 and the work piece 26.

The control circuitry 30 is coupled to the power conversion circuitry 32, which supplies the weld power (e.g., pulsed waveform) that is applied to the electrode 18 at the torch 16. The power conversion circuitry 32 is coupled to a source of electrical power as indicated by arrow 34. The power applied to the power conversion circuitry 32 may originate in the power grid, although other sources of power may also be used, such as power generated by an engine-driven generator, batteries, fuel cells or other alternative sources. Components of the power conversion circuitry 32 may include choppers, boost converters, buck converters, inverters, and so forth.

The control circuitry 30 controls the current and/or the voltage of the weld power supplied to the torch 16. The control circuitry 30 may monitor the current and/or voltage of the arc 24 based at least in part on one or more sensors 36 within the wire feeder 14 or torch 16. In some examples, a processor 35 of the control circuitry 30 determines and/or controls the arc length or electrode extension based at least in part on feedback from the sensors 36. The arc length is defined herein as the length of the arc between the electrode 18 and the work piece 26. The processor 35 determines and/or controls the arc length or electrode extension utilizing data (e.g., algorithms, instructions, operating points) stored in a memory 37. The data stored in the memory 37 may be received via the operator interface 28, a network connection, or preloaded prior to assembly of the control circuitry 30. Operation of the power source 12 may be controlled in one or more modes, such as a constant voltage (CV) regulation mode in which the control circuitry 30 controls the weld voltage to be substantially constant while varying the weld current during a welding operation. That is, the weld current may be based at least in part on the weld voltage. Additionally, or in the alternative, the power source 12 may be controlled in a current control mode in which the weld current is controlled independent of the weld voltage. In some examples, the power source 12 is controlled to operate in a constant current (CC) mode where the control circuitry 30 controls the weld current to be substantially constant while varying the weld voltage during a welding operation.

Figure 2:
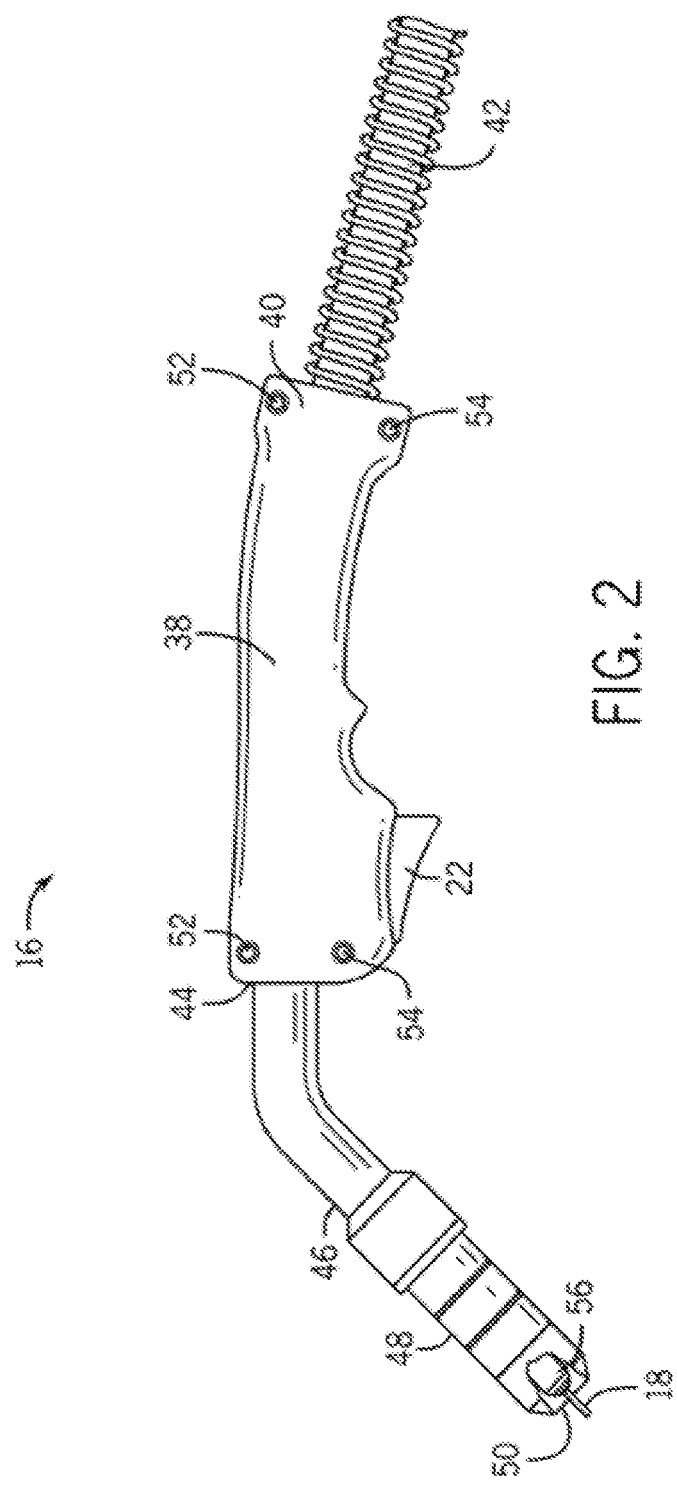
FIG. 2 is a side view of an example of a welding torch of the MIG welding system of FIG. 1, in accordance with this disclosure.

FIG. 2 is a side view of an example of a welding torch 16 of the MIG welding system of FIG. 1, which may use any of the example gas diffuser assemblies, nozzle assemblies, and/or other components discussed below. As discussed in relation to FIG. 1, the torch 16 includes the trigger 22 for initiating a weld and supplying the electrode 18 to the weld. Specifically, the trigger 22 is disposed on a handle 38. A welding operator holds the handle 38 when performing a weld. At a first end 40, the handle 38 is coupled to a cable 42 where welding consumables (e.g., the electrode, the shielding gas, and so forth) are supplied to the weld. Welding consumables generally travel through the handle 38 and exit at a second end 44, which is disposed on the handle 38 at an end opposite from the first end 40.

The torch 16 includes a gooseneck 46 extending out of the second end 44 of the handle 38. As such, the gooseneck 46 is coupled between the handle 38 and a welding nozzle 48. As should be noted, when the trigger 22 is pressed or actuated, welding wire (e.g., electrode 18) travels through the cable 42, the handle 38, the gooseneck 46, and the welding nozzle 48, so that the welding wire extends out of an end 50 (i.e., torch tip) of the welding nozzle 48. Further, as illustrated in FIG. 2, the handle 38 is secured to the gooseneck 46 via fasteners 52 and 54, and to the cable 42 via fasteners 52 and 54. The welding nozzle 48 is illustrated with a portion of the welding nozzle 48 removed to show the electrode 18 extending out of a contact tip 56 that is disposed within the welding nozzle 48. While the example torch 16 illustrated in FIG. 2 is designed for welding by a human operator, one or more torches designed for use by a robotic welding system may alternatively, or additionally, be used with the welding system of FIG. 1. For example, the torch 16 may be modified to omit the trigger 22, may be adapted for water cooling, etc. The example torch 16 illustrated in FIG. 2 may also be used with any of the example gas diffuser assemblies, nozzle assemblies, and/or other components discussed below.

Figure 7A:
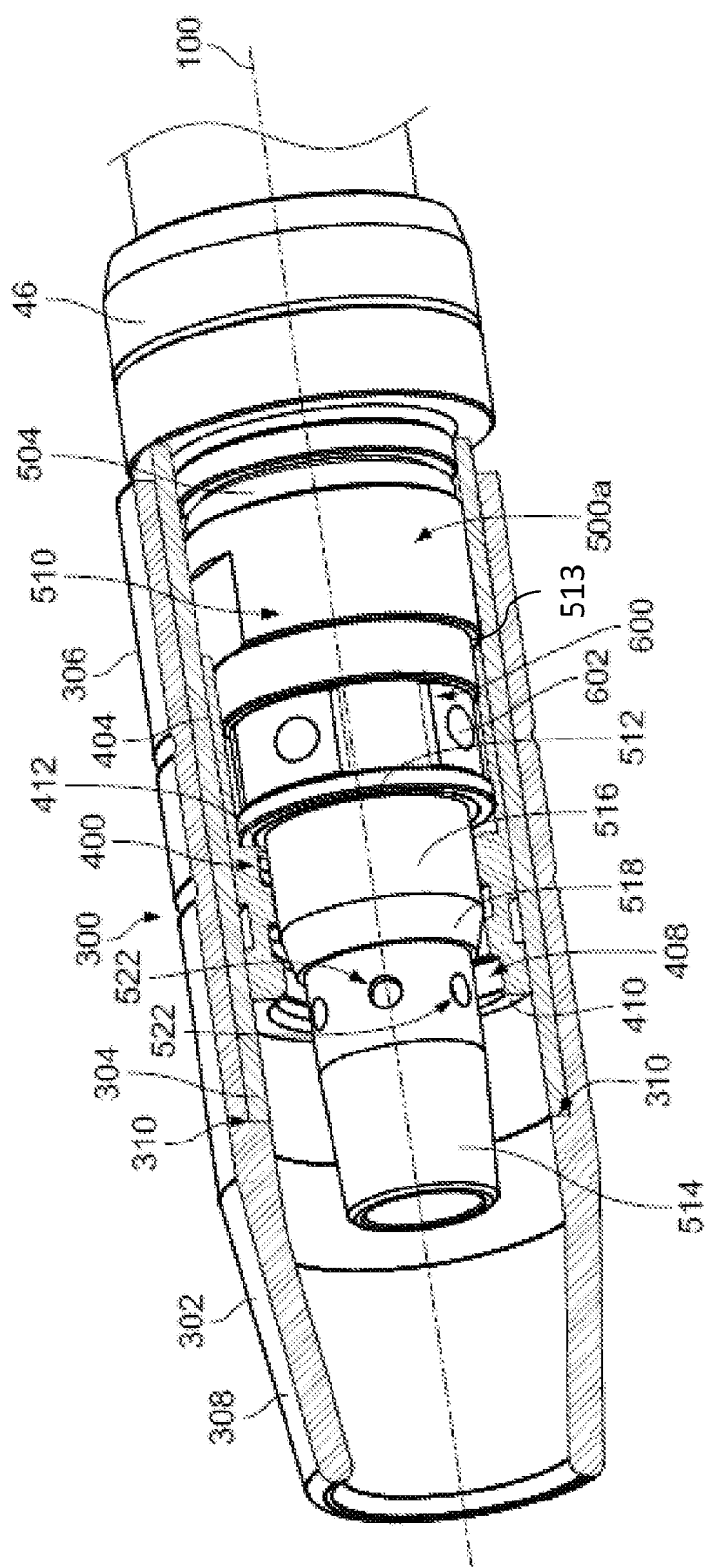
FIG. 7a is a partial cutaway view of an example nozzle assembly coupled to an example slip-on style gas diffuser assembly, in accordance with this disclosure.
Figure 7B:
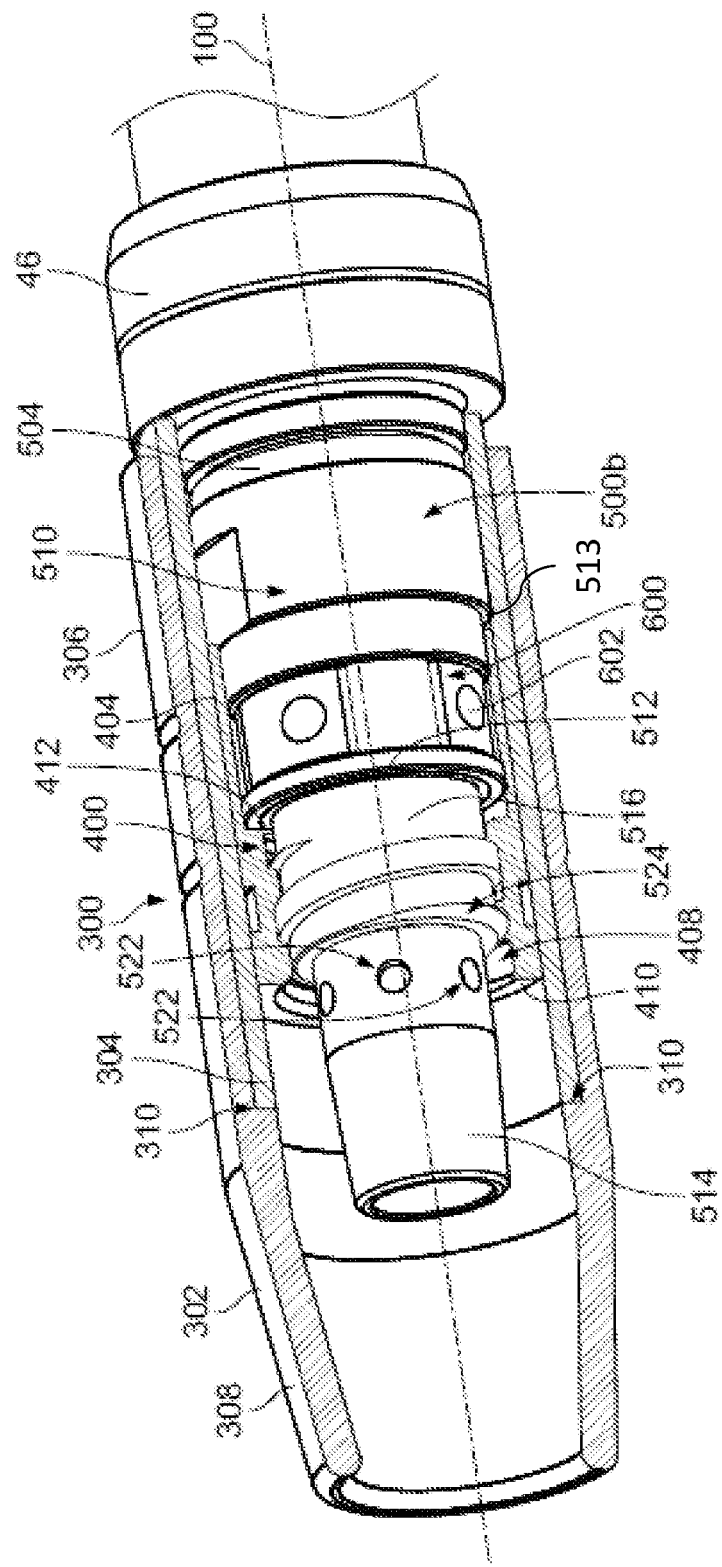
FIG. 7b is a partial cutaway view of an example nozzle assembly coupled to an example screw-on style gas diffuser assembly, in accordance with this disclosure.

While conventional nozzle assemblies are configured to support and/or attach to only one or the other of slip-on or screw-on gas diffuser assemblies, the nozzle assembly 300 is configured to support both slip-on and screw-on gas diffuser assemblies 500a, 500b. FIG. 3 shows an exploded view of the nozzle assembly 300. FIG. 7a shows the nozzle assembly 300 with a slip-on gas diffuser assembly 500a. FIG. 7b shows the nozzle assembly 300 with a screw-on gas diffuser assembly 500b. The components of the nozzle assembly 300 and gas diffuser assemblies 500a, 500b share an axis 100 when assembled and coupled together.

The nozzle assembly 300 includes a nozzle shell 302, an electrically insulating sleeve 304, and a nozzle insert 400. The nozzle shell 302 is substantially hollow, with a bore extending through an approximate middle of the nozzle shell 302. The nozzle shell 302 includes a substantially tubular rear portion 306 and a tapering front portion 308 that narrows the outer and inner diameter of the nozzle shell 302. As shown in FIGS. 7a and 7b, the nozzle shell 302 also includes a step 310 on its inner wall that is configured to abut the electrically insulating sleeve 304, so as to prevent the insulating sleeve 304 from proceeding further forward within the nozzle shell 302.

The electrically insulating sleeve 304 is positioned within the nozzle shell 302, between the nozzle shell 302 and the nozzle insert 400. The electrically insulating sleeve 304 is formed of electrically insulating material, so as to prevent electrical power conducted through gas diffuser from being conducted to the nozzle shell 302, which may also be electrically conductive in some examples. The electrically insulating sleeve 304 extends along an inner surface of the nozzle shell 302. The electrically insulating sleeve 304 abuts the step 310 of the nozzle shell 302 proximate the transition from the tubular rear portion 306 to the tapering front portion 308.

Figure 4A:
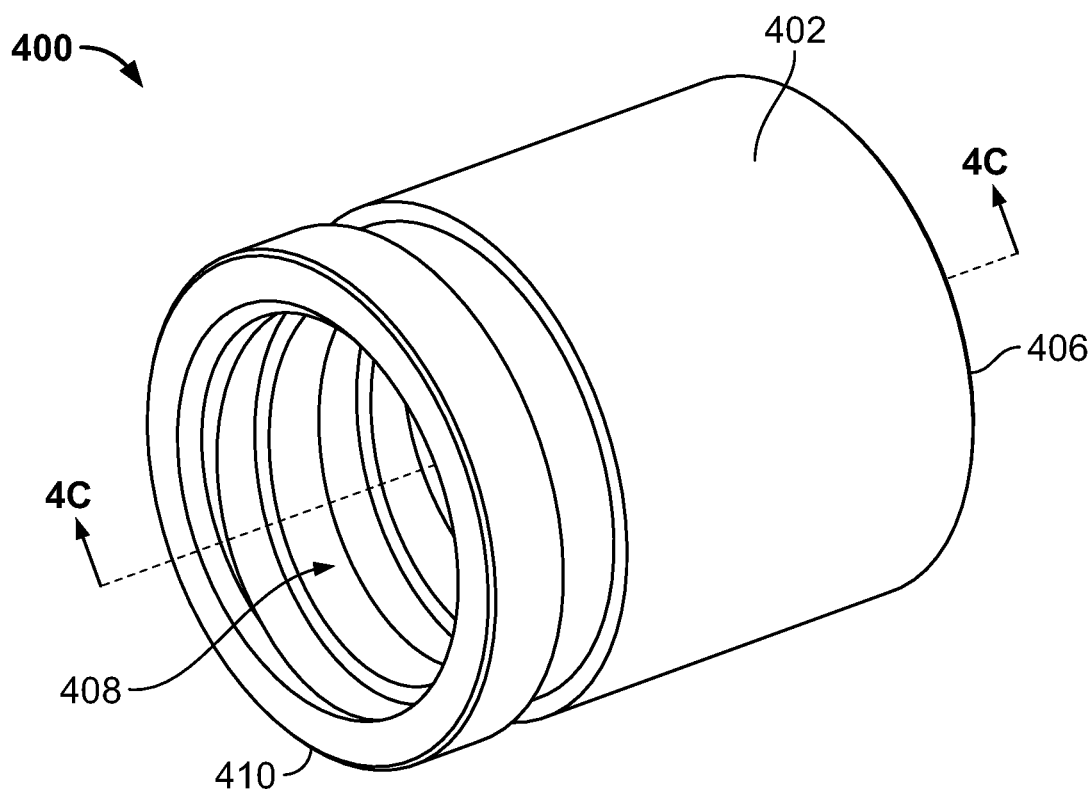
FIG. 4a is a front perspective view of an example nozzle insert, in accordance with this disclosure.
Figure 4B:
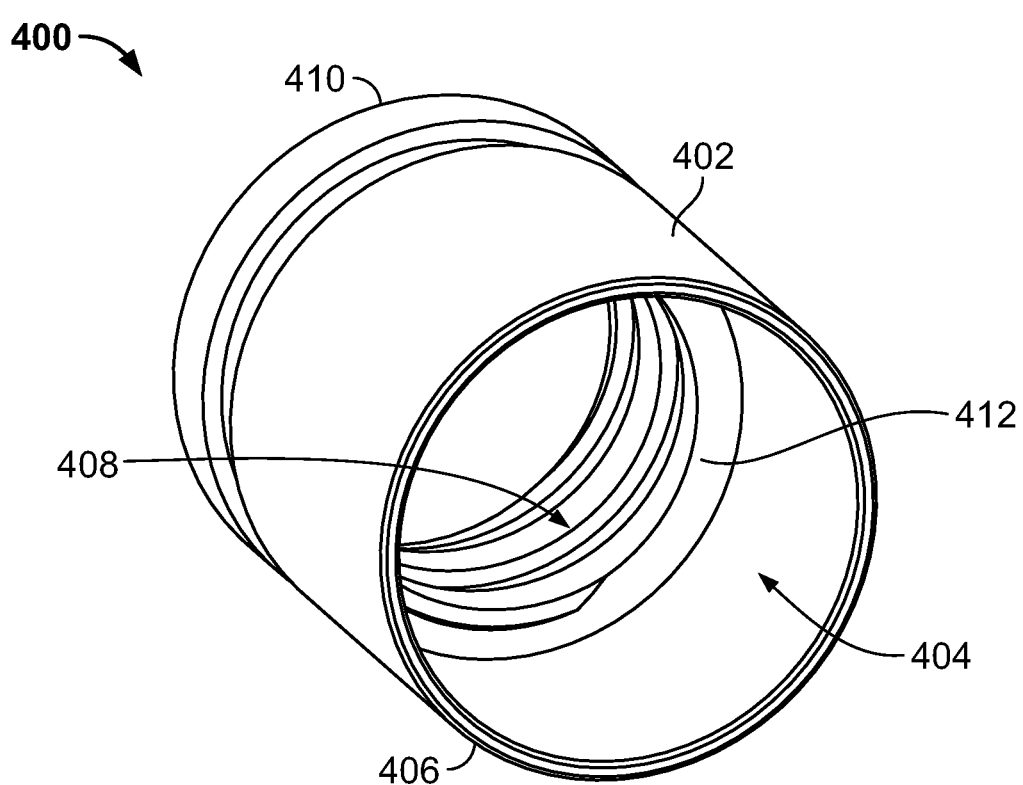
FIG. 4b is a rear perspective view of the example nozzle insert of FIG. 4a, in accordance with this disclosure.
Figure 4C:
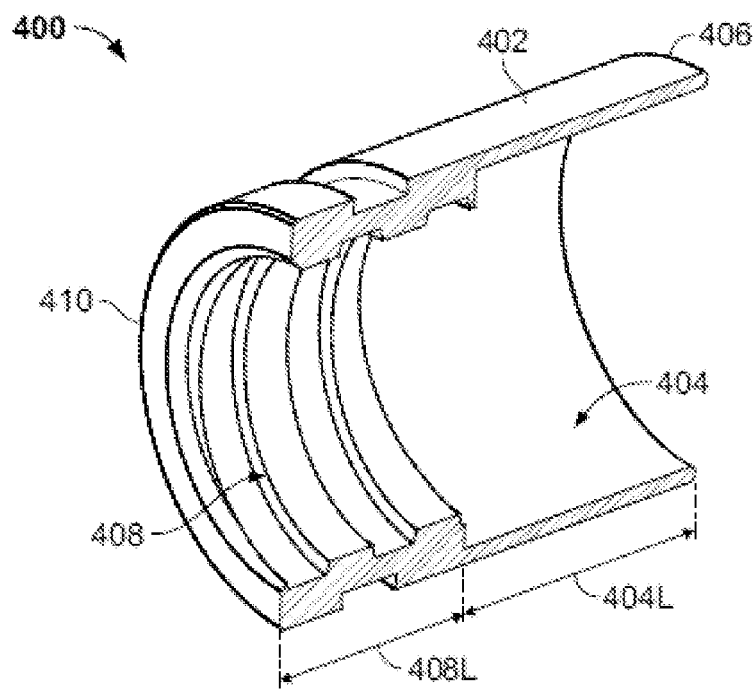
FIG. 4c is a cross-section view of the example nozzle insert of FIG. 4a, along the line 4c-4c, in accordance with this disclosure.

FIGS. 4a-4c show various views of the nozzle insert 400. The nozzle insert 400 allows nozzle assembly 300 to support both screw-on and slip-on gas diffuser assemblies. In FIGS. 7a and 7b, the nozzle insert 400 is positioned within the nozzle shell 302, adjacent the electrically insulating sleeve 304, approximately midway along the axial length of the nozzle shell 302. In some examples, the outer diameter of the nozzle insert 400 may be approximately equal to an inner diameter of the nozzle shell 302 at the step 310 (or the inner diameter of the nozzle shell 302 at its tubular rear portion 306 minus the thickness of the insulating sleeve 304), such that the nozzle insert 400 fits snugly within the nozzle shell 302 and insulating sleeve 304. Because of the snug fit, the nozzle insert 400 may hold the insulating sleeve 304 in place against the nozzle shell 302. In some examples, the nozzle insert 400 is approximately cylindrical, though in some examples the nozzle insert 400 may be shaped differently to accommodate the shape of the nozzle assembly 300. The nozzle insert 400 includes a cylindrical wall 402 surrounding a hollow interior. The nozzle insert 400 includes an engaging surface 404 formed on the inner wall 402 towards a rear end 406 of the nozzle insert 400, and a threaded surface 408 formed in the wall 402 towards a front end 410 of the nozzle insert 400. In some examples, this configuration may be reversed, such that the engaging surface 404 is formed on the inner wall 402 towards the front end 410 of the nozzle insert 400, and the threaded surface 408 is formed in the wall 402 towards the rear end 406 of the nozzle insert 400.

The engaging surface 404 is configured to frictionally engage a gas diffuser assembly, such as a slip-on gas diffuser assembly 500a, for example. In some examples, the frictional engaging surface 404 may also frictionally engage screw-on style gas diffusers 500b. The engaging surface has an axial length 404L. In some examples, the engaging surface 404 may be formed with textures (e.g. knurls, bumps, etc.) configured to increase frictional engagement between the engaging surface 404 and the gas diffuser assemblies 500a, 500b.

The threaded surface 408 includes female threaded grooves configured to threadingly engage complementary male threads of a screw-on gas diffuser assembly 500b. In some examples, the threaded surface 408 may be configured to simply pass over portions of slip-on style gas diffuser assemblies 500a, without engaging, impeding, and/or inhibiting the gas diffuser assemblies 500a. The threaded surface 408 has an axial length 408L.

The engaging surface 404 and threaded surface 408 of the nozzle insert 400 are separated by a shoulder 412 formed in the wall 402. The shoulder 412 is configured to abut a complementary front shoulder 512 of a gas diffuser assembly 500a, 500b. While the outer diameter of the nozzle insert 400 is relatively continuous along the axial length of the nozzle insert 400, the inner diameter fluctuates. The inner diameter of the nozzle insert 400 along the axial length 404L of the engaging surface 404 is larger than the major and minor inner diameters of the nozzle insert 400 along the axial length 408L of the threaded surface 408. In some examples, this configuration may be reversed, with the inner diameter of the nozzle insert 400 along the axial length 404L of the engaging surface 404 being smaller than the major and minor inner diameters of the nozzle insert 400 along the axial length 408L of the threaded surface 408. The shoulder 412 of the nozzle insert 400 serves as the transition point of the inner diameter.

Figure 5A:
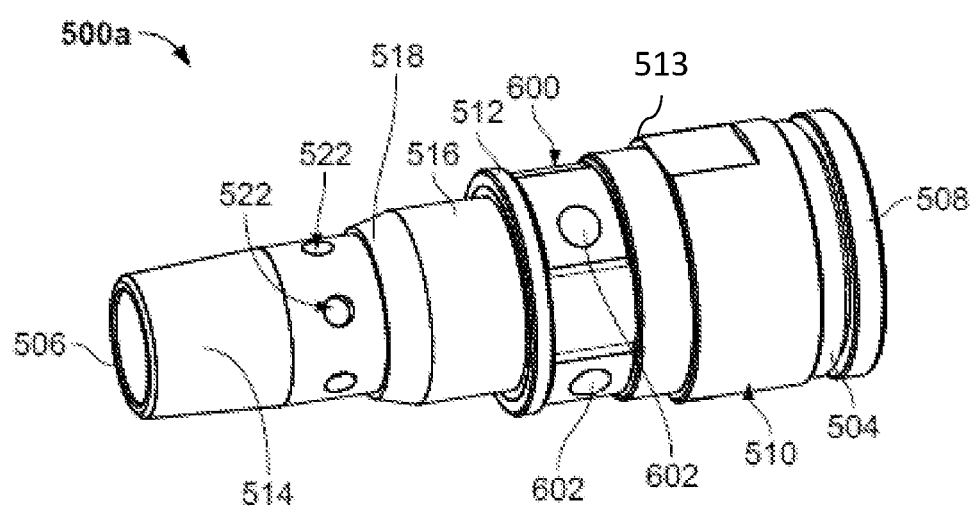
FIG. 5a is a front perspective view of an example slip-on gas diffuser assembly, in accordance with this disclosure.

FIG. 5a shows a slip on style gas diffuser assembly 500a. FIG. 7a shows a slip-on style gas diffuser assembly 500a coupled to the nozzle assembly 300 via the nozzle insert 400 in accordance with aspects of the present disclosure. The gas diffuser assembly 500a helps to guide welding consumables (e.g., the electrode, the shielding gas, and so forth) within the nozzle assembly 300 of the welding torch 16. The gas diffuser assembly 500a includes a gas diffuser 502a, a compressible retaining ring 600, and an O-ring 504. In some examples, the gas diffuser assembly 500a may also include other components.

The gas diffuser 502a is the primary component of the gas diffuser assembly 500a. FIG. 5c shows an example gas diffuser 502a for use with the gas diffuser assembly 500a. The gas diffuser 502a acts as an interface between the gooseneck 46 and the contact tip 56. The gas diffuser 502a is configured to transfer electrical energy to the contact tip 56 (not shown) from the gooseneck 346 and transfer heat energy from the contact tip 56 back into the gooseneck 46. While other components may cooperate with the gas diffuser 502a, the gas diffuser 502a provides the primary transmission path for heat and electrical current between the contact tip 56 and the gooseneck 46. To increase the amount of electrical and heat energy transferred, the gas diffuser 502a may be constructed using an electrically conductive and/or thermally conductive material. A bore (and/or passage) extends through an approximate middle (and/or center) of the gas diffuser 502a. The bore extends from the front end 506 through to the rear end 508. The bore accommodates movement of welding consumables (e.g. wire electrode 18 and/or shielding gas) from the gooseneck 46 through the gas diffuser 502a and/or gas diffuser assembly 500a.

In some examples, the gas diffuser 502a includes a substantially cylindrical base 510 towards the rear end 508 of the gas diffuser 502a and a substantially cylindrical nose 514 towards the front end 506 of the gas diffuser 502a. A substantially cylindrical central core 516 is positioned between the nose 514 and the base 510. The central core 516 connect to the base 510 at a front shoulder 512. The central core 516 connects to the nose 514 through a taper 518. The base 510 has an outer diameter that is larger than the outer diameter of the nose 514 and the central core 516. The central core 516 has an outer diameter that is larger than the outer diameter of the nose 514 and smaller than the outer diameter of the base 510. The base 510 may include an O-ring groove 505 configured to receive an O-ring 504. In some examples, the base 510 may also include a rear shoulder 513 configured to abut a rear end 406 of the nozzle insert 400 when the gas diffuser assembly 500a is coupled to the nozzle assembly 300.

In some examples, the gas diffuser 502a may be configured to be coupled to the gooseneck 46 through the base 510 of the gas diffuser 502a. In some examples, the base 510 of the gas diffuser 502a may include features configured to frictionally engage the engaging surface 404 of the nozzle insert 400, so as to retain the gas diffuser 502a within the nozzle assembly 300 and/or insert 400 using frictional force.

Figure 6A:
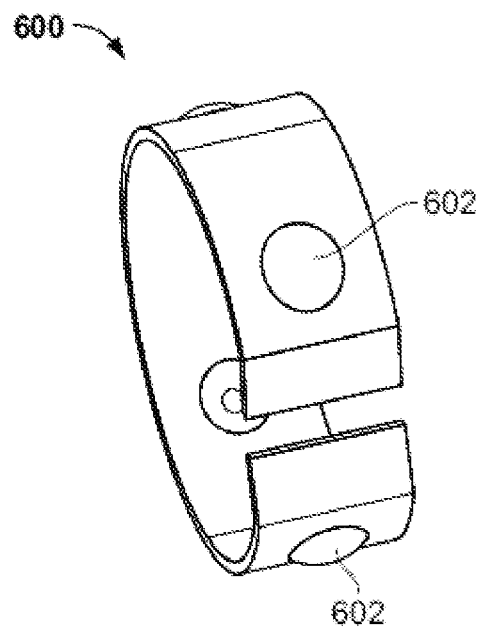
FIGS. 6a and 6b are perspective views of an example compressible retaining ring, in accordance with this disclosure.
Figure 6B:
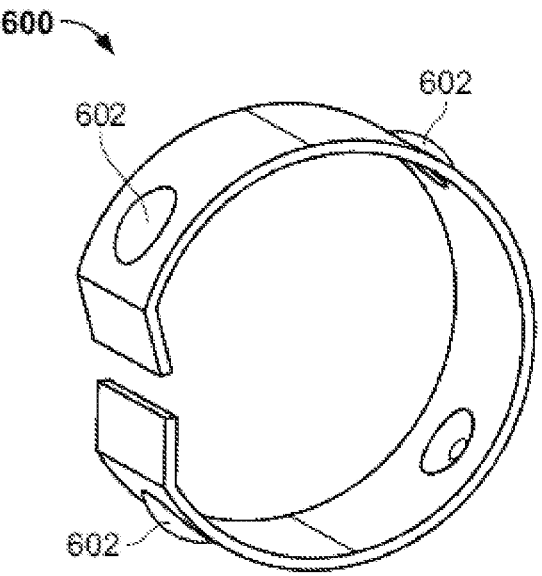

In some examples, these features may include ribs and/or protrusions (not shown) on the base 510 of the gas diffuser 502*a*. In some examples, the features may include a compressible member, such as a compressible retaining ring 600, as shown, for example, in FIGS. 6*a* and 6*b*. In some examples, the compressible retaining ring 600 may be constructed of a spring type material such that it generates a radially outward force upon being compressed. In some examples, the retaining ring 600 may be compressed when coming into contact with the engaging surface 404, and generate a radially outward force against the engaging surface 404 so as to frictionally engage the engaging surface 404 and resist removal of the gas diffuser assembly 500*a* from the nozzle insert 400. In some examples, the retaining ring 600 may have protrusions 602 to increase frictional engagement with the engaging surface. In some examples, the compressible retaining ring 600 may be a non-sealing retention device, as opposed to an O-ring, for example, which is primarily a sealing device rather than a retention device. While conventional welding torches may include gas diffuser assemblies with O-rings that come into contact with a nozzle and/or nozzle insert, these O-rings are primarily used to create a gas seal, and lack the necessary radial force to provide effective retention. The retaining ring 600 may be positioned within a ring groove 520 of the base 510 of the gas diffuser 502*a*. In some examples, the gas diffuser 502*a* may include multiple ring grooves 520, such that the retaining ring 600 may be repositioned on the gas diffuser 502*a* so as to accommodate different size nozzle inserts 400 with different size and/or length engaging surfaces 404, for example. The ring groove 520 may be positioned proximate a front shoulder 512.

In some examples, the front shoulder 512 may serve a transition between the base 510 of the gas diffuser 502*a* and the central core 516 of the gas diffuser 502*a*. In some examples, the core 516 of the gas diffuser 502*a* may be substantially smooth. In some examples, the outer diameter of the core 516 is sized so as to be able to fit within and/or slide through the bore of the nozzle insert 400 proximate the engaging surface 404 and threaded surface 408 without contacting and/or frictionally engaging the engaging surface 404 and/or threaded surface 408. The taper 518 connects the core 516 to the nose 514.

The nose 514 of the gas diffuser 502*a* is configured for attachment to a contact tip (not shown). The nose 514 includes gas holes 522 to allow gas to diffuse from within the bore of the gas diffuser 502*a*, through the gas holes 522, and into the interior of the nozzle shell 302. The nose 514 has an outer diameter that is smaller than the base 510 and core 516, such that the nose 514 may not engage or contact the nozzle insert 400 when the gas diffuser assembly 500*a*, 500*b* is coupled to the nozzle insert 400. In some examples, an axial distance from the intersection of the taper 518 and nose 514 to the front shoulder 512 may be larger than or equal to the axial length 408L of the threaded surface 408 of the nozzle insert 400. In some examples, an axial length of the core 516 may be approximately equal to the axial length 408L of the threaded surface 408 of the nozzle insert 400. This may help ensure that the nose 514 of the gas diffuser 502*a* extends outside of the nozzle insert 400, and the gas holes 522 of the nose 514 are positioned outside of and/or away from the nozzle insert 400 during operation.

Figure 5B:
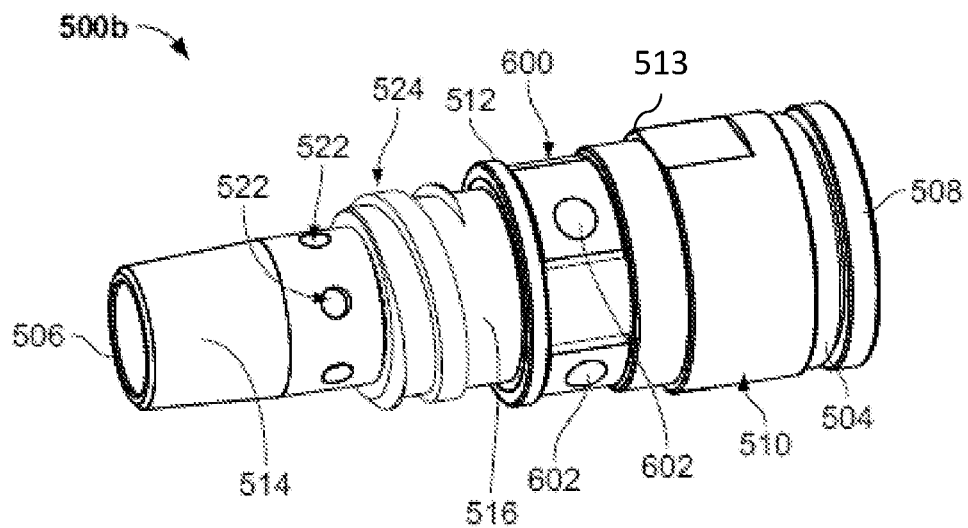
FIG. 5b is a front perspective view of an example screw-on gas diffuser assembly, in accordance with this disclosure.
Figure 5C:
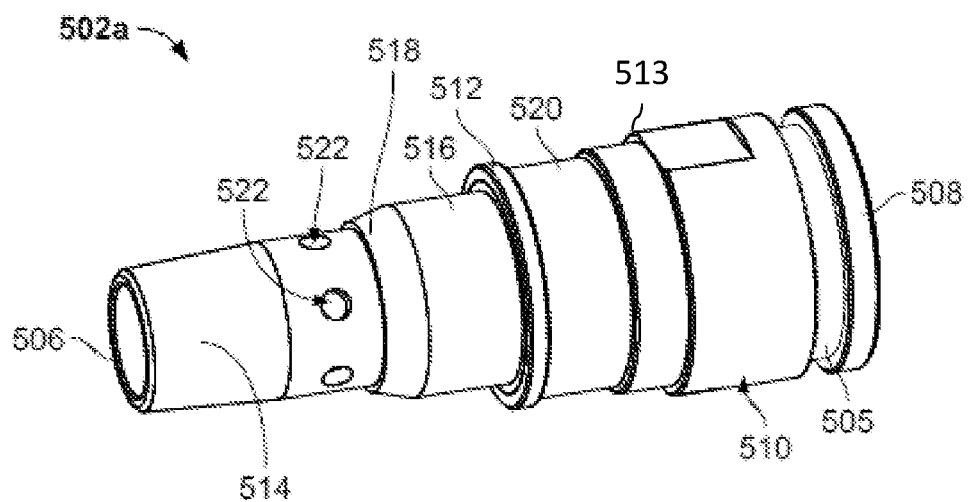
FIG. 5c is a front perspective view of an example slip-on gas diffuser, in accordance with this disclosure.
Figure 5D:
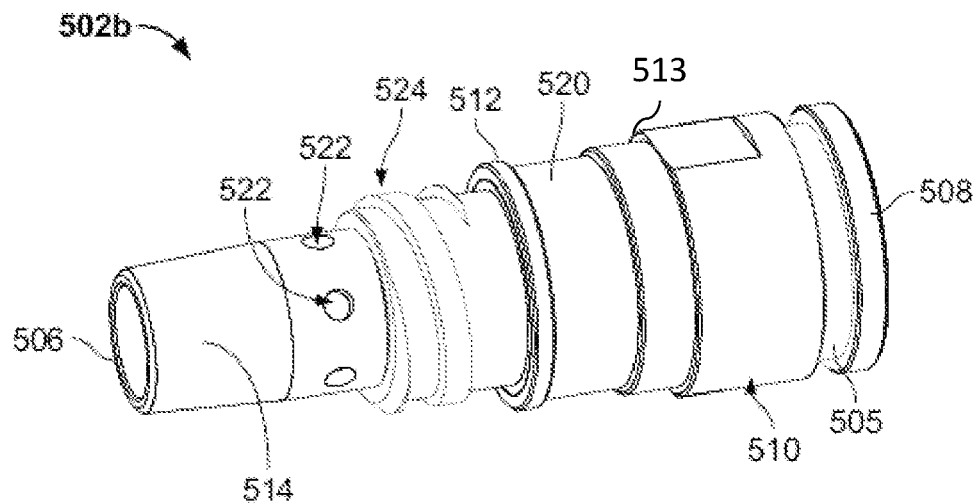
FIG. 5d is a front perspective view of an example screw-on gas diffuser, in accordance with this disclosure.

FIG. 5*b* shows an example screw-on (and/or thread-on) style gas diffuser assembly 500*b*. FIG. 5*d* shows a screw-on (and/or thread-on) style gas diffuser 502*b* in accordance with aspects of the present disclosure. FIG. 7*b* shows a screw-on style gas diffuser assembly 500*b* coupled to the nozzle assembly 300 via the nozzle insert 400 in accordance with aspects of the present disclosure. In some examples, the screw-on gas diffuser assembly 500*b* may be similar in most aspects with the slip-on gas diffuser assembly 500*a*. However, in some examples, the screw-on gas diffuser 502*b* may not have a taper 518 connecting the core 516 to the nose 514. Also, the core 516 may not be substantially smooth. Rather, in some examples, the central core 516 may be threaded with male screw threads 524 configured to threadingly engage the female threaded grooves of the threaded surface 408 of the nozzle insert 400. Torque between the threaded surface 408 of the nozzle insert 400 and the male screw threads 524 of the core 516 of the gas diffuser assembly 500*b* holds the gas diffuser assembly 500*b* in place within the nozzle shell 302 and/or nozzle insert 400. In some examples, the axial distance from a first screw thread (and/or the intersection of the nose 514 and core 516) to the compressing retaining ring 600 of the screw-on gas diffuser assembly 500*b* may be greater than or equal to the axial length 404L of the engaging surface 404 of the nozzle insert 400. In such an example, the threads 524 of the core 516 of the gas diffuser 502*b* will begin to engage with the threaded surface 408 of the nozzle insert 400 before (or at substantially the same time as) the engaging surface 404 comes into contact with the compressible retaining ring 600. This may help to prevent frictional forces between the retaining ring 600 and the engaging surface 404 from resisting insertion of the gas diffuser assembly 500*b* into the nozzle insert 400 before it is possible to begin screwing the nozzle insert 400 onto the gas diffuser assembly 500*b*.

FIGS. 7*a* and 7*b* show slip-on and screw-on style gas diffuser assemblies 500*a*, 500*b* coupled to the nozzle assembly 300 via the nozzle insert 400 in accordance with aspects of the present disclosure. In operation, an operator may assemble a nozzle assembly 300 using one of the screw-on gas diffuser assembly 500*b*, or slip-on gas diffuser assembly 500*a*, according to operator preference. If an operator wishes to use the slip-on gas diffuser assembly 500*a*, for example, the operator may take the nozzle shell 302 (with the insulating sleeve 304 and nozzle insert 400 snugly fit within) and push the slip-on gas diffuser assembly 500*a* through a rear end of the nozzle shell 302 into the nozzle insert 400. The operator may be able to push the nose 514 and core 516 of the gas diffuser assembly 500*a* through the insert with minimal friction and/or resistance because the nose 514 and core 516 of the gas diffuser assembly 500*a*, being slimmer with smaller outer diameters, will slide through the nozzle insert 400 without engaging. Eventually though, the base 510 of the gas diffuser assembly 500*a* will contact the engaging surface 404 of the nozzle insert 400, causing friction and/or resistance, after which more effort may be needed to push the gas diffuser assembly 500*a* into the nozzle insert 400. After some additional effort, the operator may push the gas diffuser assembly 500*a* in far enough that the retaining ring 600 is compressed by the engaging surface 404, providing additional radially outward force against the engaging surface 404, and increasing the friction and/or resistance. Finally, when the front shoulder 512 of the gas diffuser assembly 500*a* abuts the shoulder 412 of the nozzle insert 400 and/or the rear shoulder 513 of the gas diffuser assembly 500*a* abuts the rear end 406 of the nozzle insert 400, the operator will have pushed the gas diffuser assembly 500*a* in as far as possible. Thereafter, the operator may proceed with normal operation, confident that frictional forces between the engaging surface 404 and gas diffuser assembly 500a would retain the gas diffuser assembly 500a securely within the nozzle shell 302 and/or nozzle insert 400.

If, for example, the operator wished to replace the slip-on gas diffuser assembly 500a with the screw-on gas diffuser assembly 500b, the operator may first remove the slip-on gas diffuser assembly 500a by pulling the slip-on gas diffuser assembly 500a out of the nozzle insert 400. Some force may be needed to overcome the frictional force holding the slip-on gas diffuser assembly 500a in place. Once the slip-on gas diffuser assembly 500a has been removed, the operator may take the same nozzle shell 302 (with the insulating sleeve 304 and nozzle insert 400 still snugly fit within) and push the screw-on gas diffuser assembly 500b through the rear end of the nozzle shell 302 into the nozzle insert 400. The operator may be able to push the nose 514 of the gas diffuser assembly 500b through the insert with minimal friction and/or resistance because the nose 514 of the gas diffuser assembly 500b, being slimmer with a smaller outer diameter, will slide through the nozzle insert 400 without engaging. Eventually though, the male screw threads 524 of the central core 516 of the screw-on gas diffuser assembly 500b will contact the complementary female threaded grooves of the threaded surface 408 of the nozzle insert 400. Once this occurs, the operator may rotate the screw-on gas diffuser assembly 500b to screw the male screw threads 524 of the central core 516 of the screw-on gas diffuser assembly 500b into the complementary female threaded grooves of the threaded surface 408 of the nozzle insert 400. While the operator is screwing the screw-on gas diffuser assembly 500b into the nozzle insert 400, the base 510 and/or compressible retaining ring 600 may begin to come into contact with the engaging surface 404 of the nozzle insert 400, increasing friction and/or resistance. Finally, when the front shoulder 512 of the gas diffuser assembly 500b abuts the shoulder 412 of the nozzle insert 400 and/or the rear shoulder 513 of the gas diffuser assembly 500a abuts the rear end 406 of the nozzle insert 400, the operator will have securely screwed the gas diffuser assembly 500b. Thereafter, the operator may proceed with normal operation, while the torque of the screw threads and frictional forces between the nozzle insert 400 and gas diffuser assembly 500b retains the gas diffuser assembly 500b securely within the nozzle shell 302 and/or nozzle insert 400.

Notably, with the screw-on gas diffuser assembly 500b, both the torque of the screw threads and the frictional forces between the compressible retaining ring 600 and engaging surface 402 help to retain the gas diffuser assembly 500b within the nozzle assembly 300 and resist loosening and/or disengagement. This is in contrast with conventional screw on gas diffuser assemblies that rely exclusively on the torque of the screw threads for retention. The dual engagement features of the screw-on gas diffuser assembly 500b and nozzle assembly 300 counteract the multitude of stresses that may induce loosening and/or disengagement during welding operation (e.g. vibrations, collisions, abrasions, deformations, snags, scrapes, etc.) better than the single engagement feature of conventional screw-on gas diffuser assemblies. Also, since there is no need to change to a different nozzle shell 302 and/or nozzle insert 400 to accommodate the screw-on gas diffuser assembly 500b or slip-on gas diffuser assembly 500a, the operator may save valuable time and/or resources.

While the above operation is described as pushing the gas differ assembly 500a, 500b into the nozzle shell 302, in some examples an operator may instead push the nozzle shell 302 (and/or insulating sleeve 304 and/or nozzle insert 400) onto the gas diffuser assembly 500a, 500b. In some examples, the gas diffuser assembly 500a, 500b may already be attached to the gooseneck 46 and/or contact tip before and/or after being assembled onto the nozzle shell 302 (and/or insulating sleeve 304 and/or nozzle insert 400). In some examples, other components may also be used with the nozzle assembly 300 in operation (e.g. liner, liner guide, etc.).

While the present method and/or system has been described with reference to certain implementations, it will be understood by those skilled in the art that various changes may be made and equivalents may be substituted without departing from the scope of the present method and/or system. For example, block and/or components of disclosed examples may be combined, divided, re-arranged, and/or otherwise modified. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

What is claimed is:

1. A nozzle assembly, comprising:
a nozzle shell;
an insulator positioned within the nozzle shell; and
a nozzle insert positioned within the insulator, wherein the nozzle insert comprises:
a bore extending from a front end of the nozzle insert to a rear end of the nozzle insert,
a wall encircling the bore, the wall extending from the front end to the rear end of the nozzle insert, the wall having an inner wall surface comprising:
a first surface configured to frictionally engage a first type of gas diffuser assembly, the first surface extending from the rear end of the nozzle insert to a shoulder of the inner wall surface, and
threads to engage a second type of gas diffuser assembly, the threads extending from the shoulder to the front end of the nozzle insert,
the inner wall surface having a major diameter and a minor diameter at the threads and a first diameter at the first surface, the first diameter being constant along the first surface.

2. The nozzle assembly of claim 1, wherein the threads are configured to mate with and engage complementary screw threads of the second type of gas diffuser assembly.

3. The nozzle assembly of claim 2, wherein the shoulder is configured to abut a complementary front shoulder of the first type of gas diffuser assembly or the second type of gas diffuser assembly, and wherein the rear end is configured to abut a rear shoulder of the first type of gas diffuser assembly or the second type of gas diffuser assembly.

4. The nozzle assembly of claim 1, wherein the wall comprises an outer wall surface having an annular groove, the annular groove being a first distance from the front end of the nozzle insert when measured along a central axis of the bore, the shoulder being a second distance from the front end of the nozzle insert when measured along the central axis of the bore, and the first distance being less than the second distance.

5. The nozzle assembly of claim 4, wherein the outer wall surface has a constant second diameter between the annular groove and the rear end of the nozzle insert.

6. The nozzle assembly of claim 1, wherein the first surface comprises an annular surface.

7. The nozzle assembly of claim 1, wherein the shoulder comprises an annular shoulder formed in the inner wall surface between the threads and the first surface.

8. The nozzle assembly of claim 1, wherein the first surface is further configured to frictionally engage the second type of gas diffuser assembly when the threads are engaged to the second type of gas diffuser assembly, such that both the threads and the first surface resist disengagement of the gas diffuser assembly from the nozzle assembly.

9. A method of coupling a nozzle assembly to a gas diffuser assembly, the method comprising:
 providing a nozzle assembly having a nozzle insert configured to engage each of a screw thread and a compressible retaining ring;
 coupling the nozzle assembly to a first gas diffuser assembly having one of the screw thread or the compressible retaining ring, such that the nozzle insert engages the screw thread or the compressible retaining ring;
 uncoupling the first gas diffuser assembly from the nozzle assembly; and
 coupling the nozzle assembly to a second gas diffuser assembly having a different one of the screw thread or the compressible retaining ring than the first gas diffuser assembly.

10. The method of claim 9, wherein the nozzle assembly further comprises a nozzle shell and an insulator positioned within the nozzle shell, the nozzle insert positioned within the insulator.

11. The method of claim 9, wherein the compressible retaining ring is constructed of a spring type material such that it generates a radially outward force upon being compressed.

12. The method of claim 9, wherein the nozzle insert comprises a first surface configured to engage the compressible retaining ring, and threads configured to engaged the screw thread.

13. The method of claim 12, wherein the threads and first surface are formed on an inner wall of the nozzle insert, the inner wall having a major diameter and a minor diameter at the threads and a first diameter at the first surface, the first diameter being greater than the major diameter and the minor diameter.

14. The method of claim 9, wherein the first gas diffuser assembly has only one of the screw thread and the compressible retaining ring, and the second gas diffuser assembly has only the different one of the screw thread or the compressible retaining ring than the first gas diffuser assembly.

* * * * *